Sept. 2, 1930. T. W. B. WATLING 1,774,622
COMBINATION SCALE AND FORTUNE TELLING MACHINE
Original Filed May 31, 1927  3 Sheets-Sheet 1
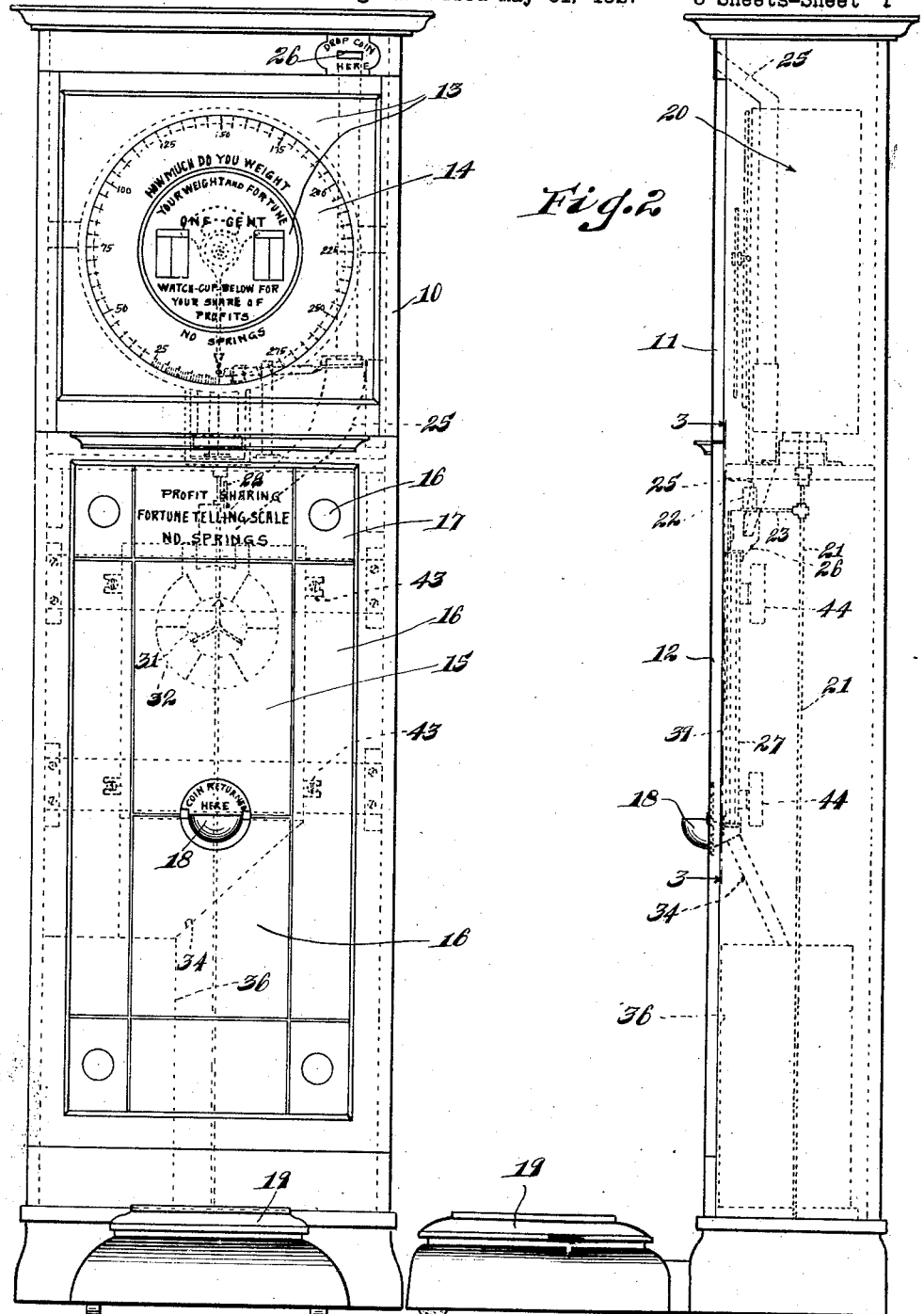

Sept. 2, 1930. T. W. B. WATLING 1,774,622
COMBINATION SCALE AND FORTUNE TELLING MACHINE
Original Filed May 31, 1927    3 Sheets-Sheet 2
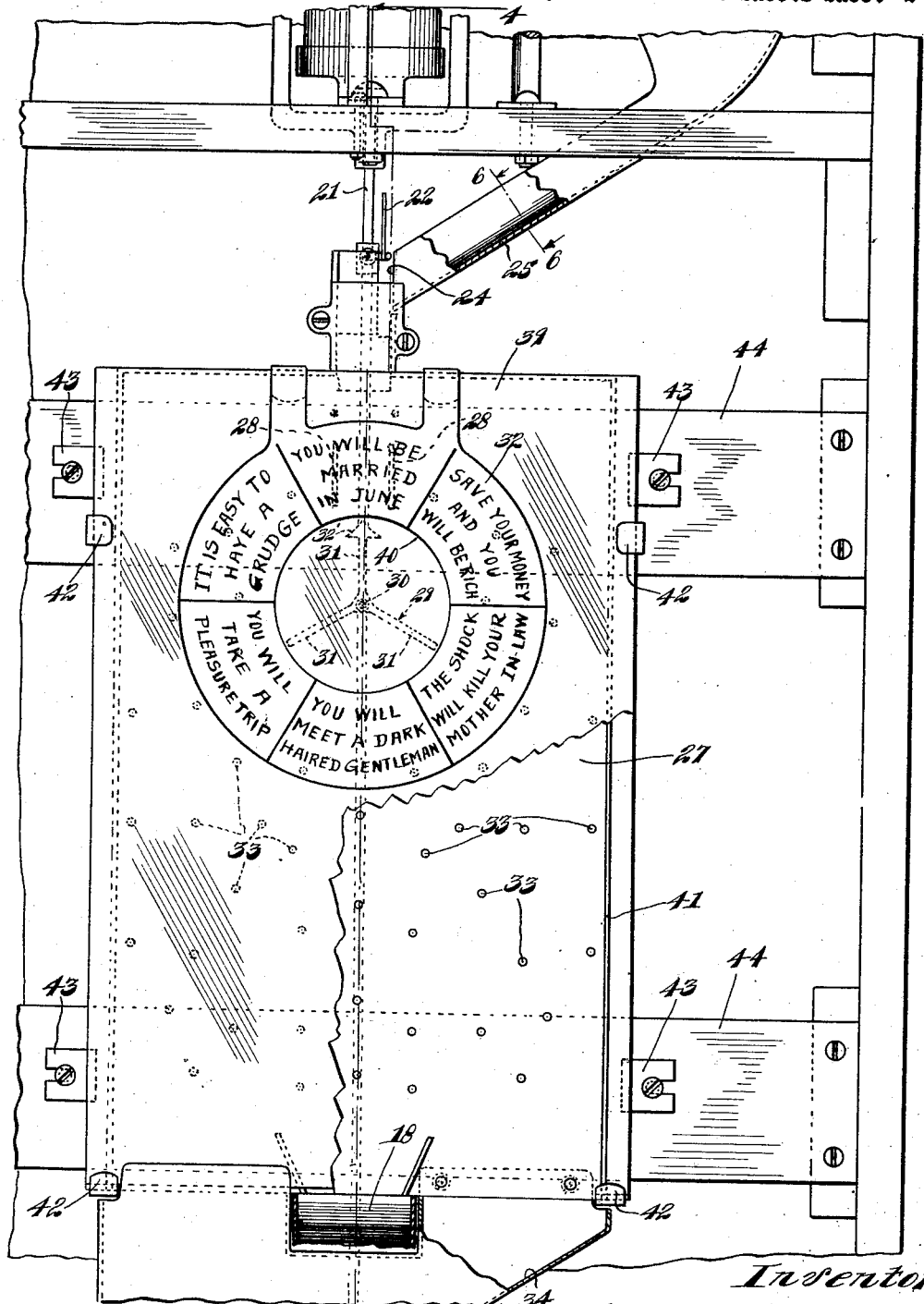

Sept. 2, 1930. T. W. B. WATLING 1,774,622
COMBINATION SCALE AND FORTUNE TELLING MACHINE
Original Filed May 31, 1927    3 Sheets-Sheet 3
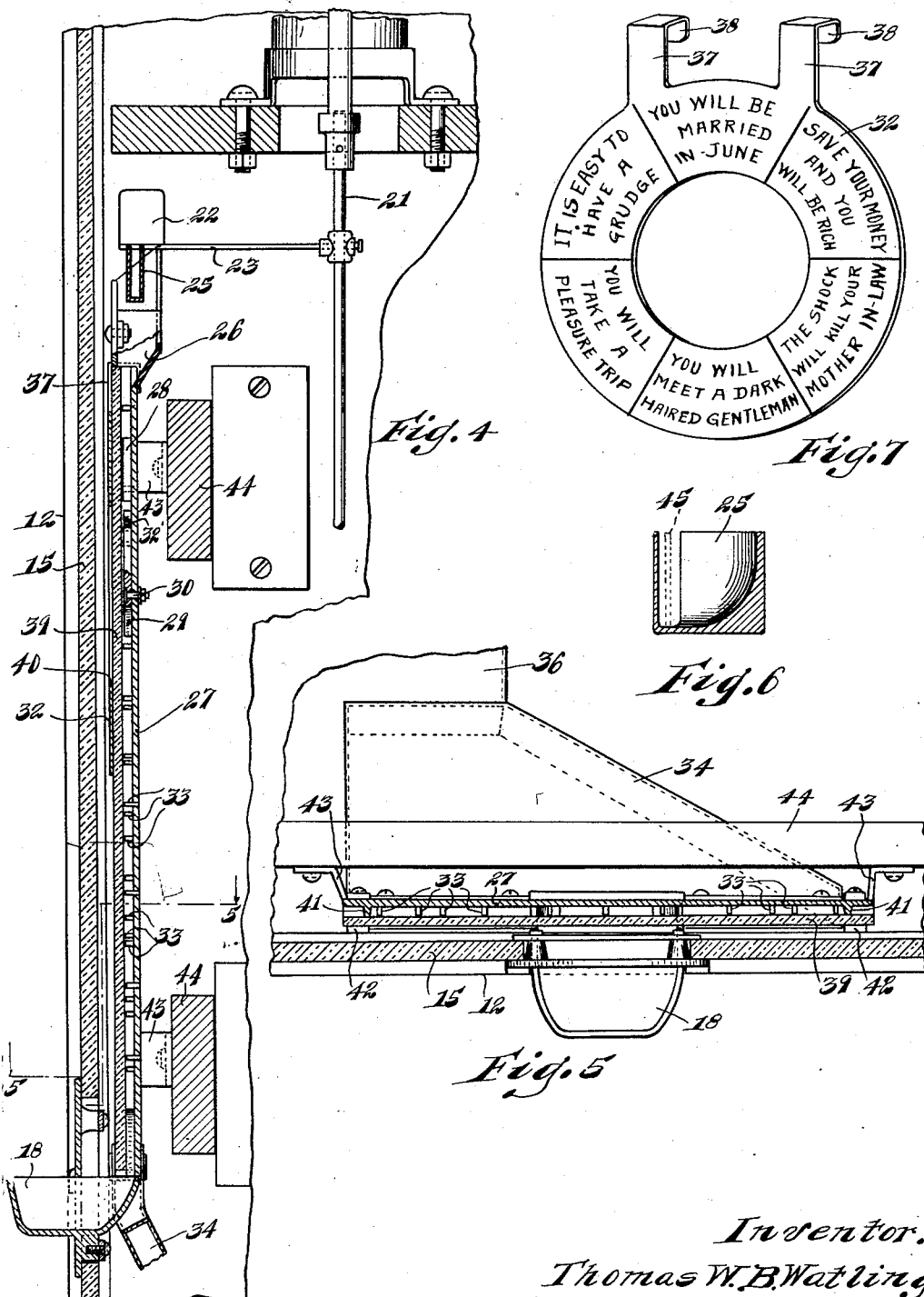

Patented Sept. 2, 1930

1,774,622

UNITED STATES PATENT OFFICE

THOMAS W. B. WATLING, OF CHICAGO, ILLINOIS

COMBINATION SCALE AND FORTUNE-TELLING MACHINE

Application filed May 31, 1927, Serial No. 195,370. Renewed July 14, 1930.

My invention relates to a combination scale and fortune telling machine, and the object of my invention is to provide a device of this character which is adapted to be operated by means of a coin. Said coin passes through the scale's mechanism first and unlocks the same, so that a person may be weighed thereon. Another object of my invention is to provide means to retain a coin in such a position as to prevent its passing through the fortune telling mechanism until the person being weighed has stepped off the scale's platform.

Another object of my invention is to provide a device of the above indicated character comprising a novel means for telling fortunes, and means whereby an occasional coin may be returned to the operator.

The invention will be best understood by reference to the accompanying drawings forming a part of this specification and in which:

Figure 1 is an elevational view of a combination scale and fortune telling machine incorporating my invention.

Figure 2 is a side view of that disclosed in Figure 1.

Figure 3 is an enlarged fragmentary view of a portion of that disclosed in Figure 1, showing the fortune telling mechanism more in detail.

Figure 4 is a sectional view taken on substantially the line 4—4 of Figure 3.

Figure 5 is a cross sectional view taken on the line 5—5 of Figure 4.

Figure 6 is a sectional view taken on the line 6—6 of Figure 3.

Figure 7 is a perspective view of a removable disc on which fortunes or legends may be inscribed.

In the drawings and for the purpose of illustration, I have shown the preferred embodiment of my invention which comprises a casing 10 for the scale and fortune telling mechanisms and is provided with a door 11 and a door 12, which normally conceal the upper and lower portions of the mechanism, respectively. The door 11 is provided with a glass front which is mirrored at 13 and is clear at 14 and may be ornamented in any suitable manner. Said clear portion is provided with means for indicating the weight of an object positioned on the scale platform, and on the door 11 are inscribed certain instructions for the benefit of the operator.

The door 12 is provided with a clear glass center portion 15 and mirrored portions 16 and suitably colored portions 17 for the purpose of pleasing the eye of prospective customers. In the center of the door 12 is provided a cup or receptacle 18, into which the coin may fall after passing through the machine, as will be hereafter more specifically pointed out. A suitable scale platform 19 is provided, upon which objects being weighed must rest.

The scale mechanism, indicated generally by 20, may be of any suitable, well-known construction and having a weight rod 21 which is operatively connected with the platform 19 and the scale mechanism 20 for the purpose of indicating weight on the dial 14.

When a weight is placed upon the platform 19, the rod 21 is drawn downwardly in the usual manner and the slide member 22, which is suitably secured by a rod 23, is adapted to be moved downwardly with the rod 21 to a position such as to obstruct the passage of a coin through the end 24 of the chute 25. The coin chute 25 is provided with an opening 26 at the upper end, through which a coin may be inserted. Said coin will pass downwardly through the chute 25 and unlock the scale mechanism in any suitable, well-known manner, so that a person on the platform 19 will be automatically weighed and the coin continues down the slot until it engages the slide 22, which is then in its lower position across the end or outlet 24.

When the person being weighed steps off the platform 19, the rod 21 is released and assumes its normal position, as shown in Figure 3, and in assuming this position, it lifts the slide 22 with it from obstructing the path of the coin, and the coin thereby falls into the receptacle 26 and passes downwardly over the face of the member 27 and between the guide members 28. As the coin leaves the guides 28, it engages some portion of the member 29 which is mounted for rotation about the pivot 30. Said member 29 is provided with a plurality of arms 31, one of which has an arrowhead 32' thereon for pointing toward one of the inscriptions on the disc 32. As the coin engages the rotatable member 29, it causes the same to rotate in one direction or the other and said coin proceeds downwardly over the plane surface of the member 27 and enters the paths between several pins 33 and finally passes off the bottom edge of the member 27 into the coin chute 34 or into the receptacle 18, as the case may be. If the coin goes into the chute 34, it is guided downwardly into the coin box 36, and if it passes into the receptacle 18, it may be reclaimed by the operator.

The disc 32 is provided with upwardly extending portions 37, which are turned over as shown in Figure 7 for providing hooks 38, by which said disc 32 may be removably positioned over the glass 39, as shown in Figure 3. The disc 32 is provided with a central opening 40, through which the rotatable member 29 may be seen.

The pins 33 may be integral with the member 27 or otherwise suitably secured thereto, and said member 27 is provided with a flange 41 for preventing the coin from passing off the sides of said member. A clear glass member 39 is positioned over the member 27, engaging the forward ends of pins 33 and being secured in position by means of hook members 42 on the sides and bottom edge of the member 27.

The member 27 is secured by brackets 43 to the cross frame members 44, as clearly shown in Figures 3, 4 and 5. The coin chute 25 is suitably curved on one side, as shown in Figure 6, for the purpose of righting the position of the coin 45 just before it reaches the lower end 24 of the chute and in order that it will readily pass from the end of said chute when the slide member 22 is lifted out of its path of travel. The pins 33 are arranged in such a manner that a plurality of paths are provided downwardly over the face of the member 27 for permitting the coin to pass over the same, and the pins are suitably spaced so that it is possible for an occasional coin to pass into the receptacle 18, from which it may be taken by the customer.

Having described my invention in its preferred form, it is obvious that variations may be made without departing from the spirit of the invention, and accordingly I do not wish to be limited to the exact details of construction illustrated and described, but desire to avail myself of such variations and modifications as come within the scope of the appendant claims.

I claim as my invention:

1. A device of the class described comprising, in combination, a weighing means and a fortune telling means; both of said means adapted to be operated by a single coin; a scale rod for said weighing means, having means thereon for obstructing the path of said coin while said weighing means is in operation.

2. A device of the class described comprising, in combination, a weighing means and a fortune telling means; both of said means adapted to be operated by a single coin; a scale rod for said weighing means having a slide secured thereto for obstructing the path of said coin while said weighing means is in operation.

3. A device of the class described comprising, in combination, a weighing means and a fortune telling means; both of said means adapted to be operated by a single coin; a scale rod for said weighing means, having an element secured thereon for temporarily obstructing the path of said coin while said weighing means is in operation; said fortune telling means being rendered inoperative and operative as the said path of said coin is obstructed and opened respectively.

4. A device of the class described comprising, in combination, a weighing means and a fortune telling means; both of said means adapted to be operated by a single coin; a scale rod for said weighing means having an element slidably secured thereon for temporarily obstructing the path of said coin while said weighing means is in operation; said fortune telling means being placed in operative condition when said element is removed to free the path of said coin.

5. A device of the class described comprising weighing means coactingly associated with fortune telling means, said weighing means and fortune telling means being actuated by coin controlled mechanism forming a part of the said device and operable by a single coin insertable in a chute attached to the device, said coin controlled mechanism provided with a slide adapted to render said fortune telling means temporarily inoperative when a coin has been inserted into the chute, said weighing means being preliminarily actuated by the said coin before the actuation of the fortune telling means, the coin being temporarily detained in the chute by said slide until the weighing means has completed its operation.

6. A device of the class described comprising in combination, a weighing means and a fortune telling means, both of said means being successively actuated by a single coin, a slide member operatively connected to said weighing means, said coin being temporarily retained by said slide member, whereby when said coin is temporarily detained by said member, said fortune telling means will be rendered inoperative while said weighing means is in operation.

7. A device of the class described comprising, in combination, weighing means and fortune telling means encased in a cabinet, a coin chute mounted in said cabinet, said weighing means adapted to be actuated by a coin deposited in said chute, a slide member operatively connected to said weighing means and adapted to temporarily retain said coin in a predetermined position to render said fortune telling means temporarily inoperative until said weighing means have functioned, whereupon said fortune telling means is rendered operative by further descent of said coin.

In testimony whereof I have signed my name to this specification.

THOMAS W. B. WATLING.